US012413022B2

(12) United States Patent
Masunaga

(10) Patent No.: US 12,413,022 B2
(45) Date of Patent: Sep. 9, 2025

(54) ELECTRICAL CONNECTOR AND CONNECTOR DEVICE

(71) Applicant: DAI-ICHI SEIKO CO., LTD., Kyoto (JP)

(72) Inventor: Takashi Masunaga, Ogori (JP)

(73) Assignee: DAI-ICHI SEIKO CO., LTD., Kyoto (JP)

( * ) Notice: Subject to any disclaimer, the term of this patent is extended or adjusted under 35 U.S.C. 154(b) by 330 days.

(21) Appl. No.: 18/089,166

(22) Filed: Dec. 27, 2022

(65) Prior Publication Data

US 2023/0135482 A1 May 4, 2023

Related U.S. Application Data

(63) Continuation of application No. 17/209,335, filed on Mar. 23, 2021, now Pat. No. 11,569,620, which is a continuation of application No. 16/720,967, filed on Dec. 19, 2019, now Pat. No. 10,985,504.

(30) Foreign Application Priority Data

Dec. 28, 2018 (JP) ................................ 2018-248235

(51) Int. Cl.
*H01R 13/6581* (2011.01)
*H01R 12/79* (2011.01)

(52) U.S. Cl.
CPC ......... *H01R 13/6581* (2013.01); *H01R 12/79* (2013.01)

(58) Field of Classification Search
CPC .. H01R 12/79; H01R 13/652; H01R 13/6581; H01R 13/6582; H01R 13/6594
See application file for complete search history.

(56) References Cited

U.S. PATENT DOCUMENTS 7,470,127 B2 12/2008 Chen
7,722,387 B2 5/2010 Yamaji
7,815,467 B2 * 10/2010 Tsuchida ............. H01R 12/716 439/607.09

(Continued)

FOREIGN PATENT DOCUMENTS

CN 203135057 U 8/2013
CN 108075263 A 5/2018

(Continued)

*Primary Examiner* — Oscar C Jimenez
(74) *Attorney, Agent, or Firm* — Oblon, McClelland, Maier &Neustadt, L.L.P.

(57) ABSTRACT

An electrical connector is attached to a wiring substrate and mated with a counterpart connector connected to a signal transmission medium. A shell of the electrical connector has a pair of wall parts that contact a ground member on the counterpart connector. One wall part distant from the signal transmission medium includes a first side plate that has one end attached to a ground conductive path of the wiring substrate and extends in a direction away from the wiring substrate, a joining part that has one end joined to another end of the first side plate, and a second side plate that has one end joined to another end of the joining part and extends in a direction closer to the wiring substrate. The second side plate has a contact piece that extends in a direction away from the wiring substrate and elastically contacts the ground member.

4 Claims, 8 Drawing Sheets

(56) References Cited

U.S. PATENT DOCUMENTS

| | | | | |
|---|---|---|---|---|
| 7,833,042 | B2 | 11/2010 | Nishio | |
| 8,602,812 | B2 | 12/2013 | Ohsaka | |
| 9,331,406 | B2 | 5/2016 | Watanabe | |
| 10,170,849 | B2 | 1/2019 | Tanaka | |
| 10,396,479 | B2 | 8/2019 | Hoshiba | |
| 10,734,741 | B2 | 8/2020 | Yukutake | |
| 10,985,504 | B2 * | 4/2021 | Masunaga | H01R 13/6581 |
| 2006/0040559 | A1 | 2/2006 | Zhang | |
| 2007/0093085 | A1 | 4/2007 | Kenjo | |
| 2013/0316566 | A1 | 11/2013 | Little | |
| 2015/0207248 | A1 | 7/2015 | Takenaga | |
| 2016/0240944 | A1 | 8/2016 | Kodaira | |
| 2018/0138606 | A1 | 5/2018 | Uchida | |
| 2018/0175561 | A1 | 6/2018 | Chen | |
| 2019/0372270 | A1 | 12/2019 | Masunaga | |
| 2021/0399467 | A1 * | 12/2021 | Liu | H01R 13/639 |

FOREIGN PATENT DOCUMENTS

| | | | |
|---|---|---|---|
| JP | 2008-097849 | A | 4/2008 |
| JP | 2012/252785 | A | 12/2012 |
| JP | 2016-103424 | A | 6/2016 |
| JP | 2017-33909 | A | 2/2017 |

* cited by examiner

ELECTRICAL CONNECTOR AND CONNECTOR DEVICE

CROSS-REFERENCE TO RELATED APPLICATION(S)

This application is a continuation of and claims benefit under 35 U.S.C. § 120 to U.S. application Ser. No. 17/209,335, filed Mar. 23, 2021, which is a continuation of and claims benefit under 35 U.S.C. § 120 to U.S. application Ser. No. 16/720,967, filed Dec. 19, 2019, which is based upon and claims the benefit of priority under 35 U.S.C. § 119 from Japanese Patent Application No. 2018-248235, filed Dec. 28, 2018, the entire contents of each of which are herein incorporated by reference.

BACKGROUND OF THE INVENTION

1. Field of the Invention

A disclosed embodiment relates to an electrical connector and a connector device.

2. Description of the Related Art

Conventionally, a connector device for electrically connecting a signal transmission medium such as a coaxial cable, a flexible printed circuit (FPC), or a flexible flat cable (FFC) to a wiring substrate has been widely used in an electronic instrument. Such a connector device includes a first connector that is connected to a terminal of a signal transmission medium and a second connector that is connected to a wiring substrate. In an electronic instrument where such a type of connector device is used therein, electromagnetic interference that is caused by radiation of an electromagnetic wave or the like may be problematic, so that a shield function may be provided to a connector device.

For example, Japanese Patent Application Publication No. 2008-097849 discloses a connector device that covers a housing where a plurality of signal contacts are arrayed thereon with a shell with a conductive property that is provided on a first connector and a shell with a conductive property that is provided on a second connector. Such a connector device has a configuration for causing a ground member with a conductive property on a first connector to contact a shell with a conducive property on a second connector, and a shield function thereof is improved by such a configuration.

However, further improvement of a shield function in a connector device is desired with a frequency increase of a signal that is transmitted or received, an increase of an operation frequency, or the like, in an electronic instrument where such a connector device is used therein.

SUMMARY OF THE INVENTION

An electrical connector according to an aspect of an embodiment is an electrical connector that is attached to a wiring substrate and mated with a counterpart connector that is connected to a terminal of a signal transmission medium, and that includes a housing that has an insulation property, a plurality of contacts with a conductive property that are arrayed on the housing, and a shell with a conductive property. The shell with a conductive property has a pair of wall parts that are opposed to one another via the plurality of contacts in a direction along a principal surface of the wiring substrate where the direction is orthogonal to an array direction of the plurality of contacts and contact a ground member with a conductive property on the counterpart connector. Among the pair of wall parts, one wall part that is provided at a position that is distant from the signal transmission medium includes a first side plate that is provided with one end that is attached to a ground conductive path of the wiring substrate and extends in a direction away from the wiring substrate from the one end toward another end, a joining part that is provided with one end that is joined to another end of the first side plate, and a second side plate that is provided with one end that is joined to another end of the joining part and extends in a direction closer to the wiring substrate from the one end toward another end where the other end is a free end. The second side plate has a contact piece that extends in a direction away from the wiring substrate and elastically contacts the ground member of the counterpart connector.

BRIEF DESCRIPTION OF THE DRAWING(S)

DETAILED DESCRIPTION OF THE PREFERRED EMBODIMENT(S)

Hereinafter, an embodiment(s) of an electrical connector and a connector device as disclosed in the present application will be explained in detail, with reference to the accompanying drawing(s). Additionally, this invention is not limited by an embodiment(s) as illustrated below.

1. Configuration of Connector Device

First, a connector device that includes a plug connector and a receptacle connector according to an embodiment will be explained with reference to FIG. 1 and FIG. 2.

Figure 1:
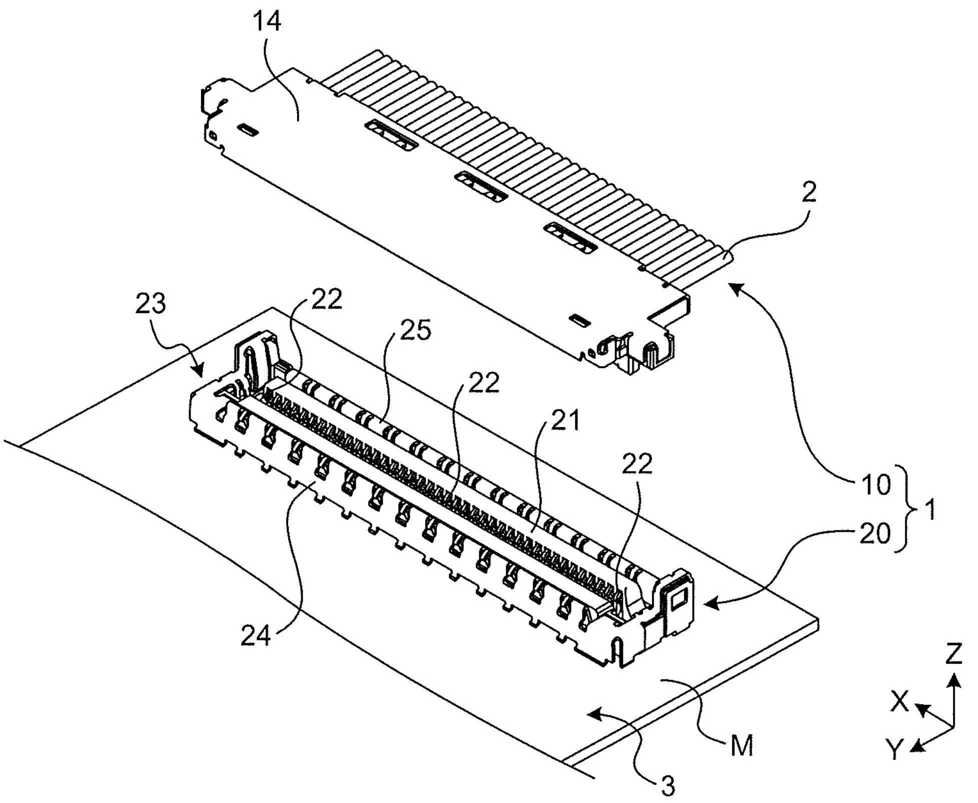
FIG. 1 is a diagram illustrating an example of a plug connector and a receptacle connector in a connector device according to an embodiment.
Figure 2:
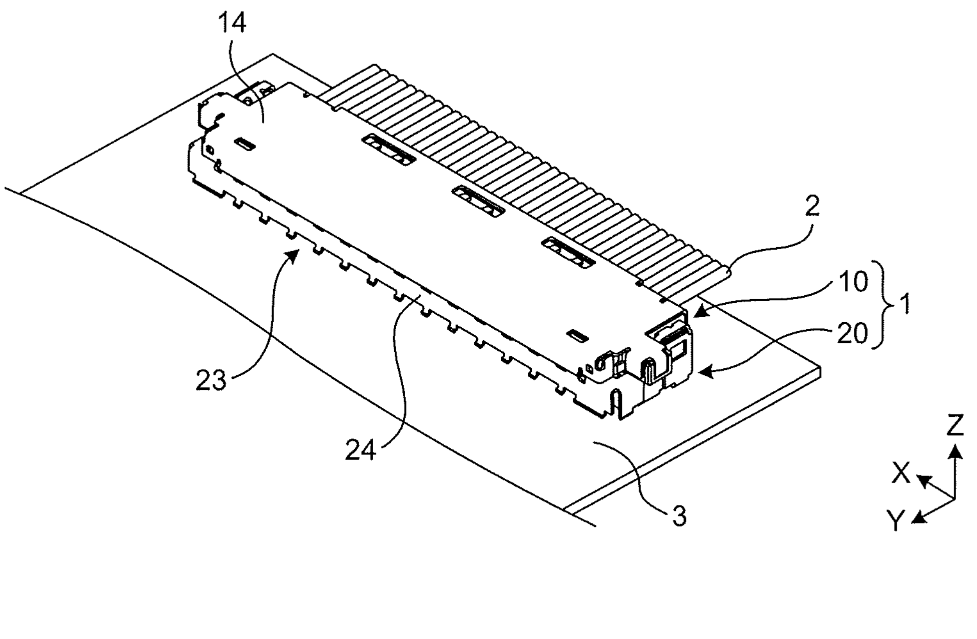
FIG. 2 is a diagram illustrating a state where a plug connector and a receptacle connector according to an embodiment are mated therewith.

As illustrated in FIG. 1, a connector device 1 according to an embodiment includes a plug connector 10 that is connected to terminals of a plurality of coaxial cables 2 and a receptacle connector 20 that is attached to a wiring substrate 3. The plurality of coaxial cables 2 are an example of a signal transmission medium. Additionally, the plug connector 10 may be a configuration to be connected to a terminal of a signal transmission medium such as a flexible printed circuit (FPC) or a flexible flat cable (FFC), instead of the plurality of coaxial cables 2. The wiring substrate 3 is, for example, an electrical circuit substrate such as a printed wiring substrate.

The plug connector 10 is an example of a counterpart connector and a first connector and the receptacle connector 20 is an example of an electrical connector and a second connector. Additionally, only a part of the coaxial cables 2 is conveniently illustrated in the drawing(s) and a boundary with a remaining part thereof is illustrated as a cross section thereof.

Furthermore, hereinafter, a direction where the plug connector 10 is inserted into the receptacle connector 20 therein (a negative direction of a Z-axis) is a "downward direction" and a removal direction (a positive direction of the Z-axis) that is an opposite direction thereof is an "upward direction", for explanatory convenience. Furthermore, longitudinal directions of the plug connector 10 and the receptacle connector 20 (positive and negative directions of an X-axis) are "leftward and rightward directions". Furthermore, transverse directions of the plug connector 10 and the receptacle connector 20 (positive and negative directions of a Y-axis) are "frontward and backward directions".

In the connector device 1, a plurality of contacts 12 with a conductive property as described later (see FIG. 4) on the plug connector 10 are electrically connected to a plurality of contacts 22 with a conductive property that are arrayed on a housing 21 of the receptacle connector 20, by mating between the plug connector 10 and the receptacle connector 20. Thereby, a center conductor 2*a* as described later (see FIG. 6) of such a coaxial cable 2 and a non-illustrated signal conductive path that is formed on a principal surface M of the wiring substrate 3 are electrically connected thereto via the contacts 12, 22.

As the plug connector 10 is mated with the receptacle connector 20, the plurality of contacts 12 and the plurality of contacts 22 as described above are covered by a shell 14 with a conductive property on the plug connector 10 and a shell 23 with a conductive property on the receptacle connector 20. The shells 14, 23 are ground members that are connected to ground and it is possible to provide the connector device 1 with a shield function by such shells 14, 23.

Furthermore, the shell 23 of the receptacle connector 20 has a front wall part 24 and a back wall part 25 that are opposed to one another via the plurality of contacts 22 in frontward and backward directions that are directions along the principal surface M of the wiring substrate 3 where the directions are orthogonal to an array direction of the plurality of contacts 22. Each of such a front wall part 24 and a back wall part 25 contacts a ground member of the plug connector 10.

Specifically, the back wall part 25 contacts a conductive member 13 (see FIG. 6) of the plug connector 10 and the front wall part 24 contacts the shell 14 of the plug connector 10. Thereby, it is possible to further improve a shield function in the connector device 1. Additionally, the shell 14 and the conductive member 13 are an example of a ground member. Although the shell 14 and the conductive member 13 are separate bodies, the shell 14 and the conductive member 13 may be formed integrally.

2. Configuration of Plug Connector 10

Figure 3:
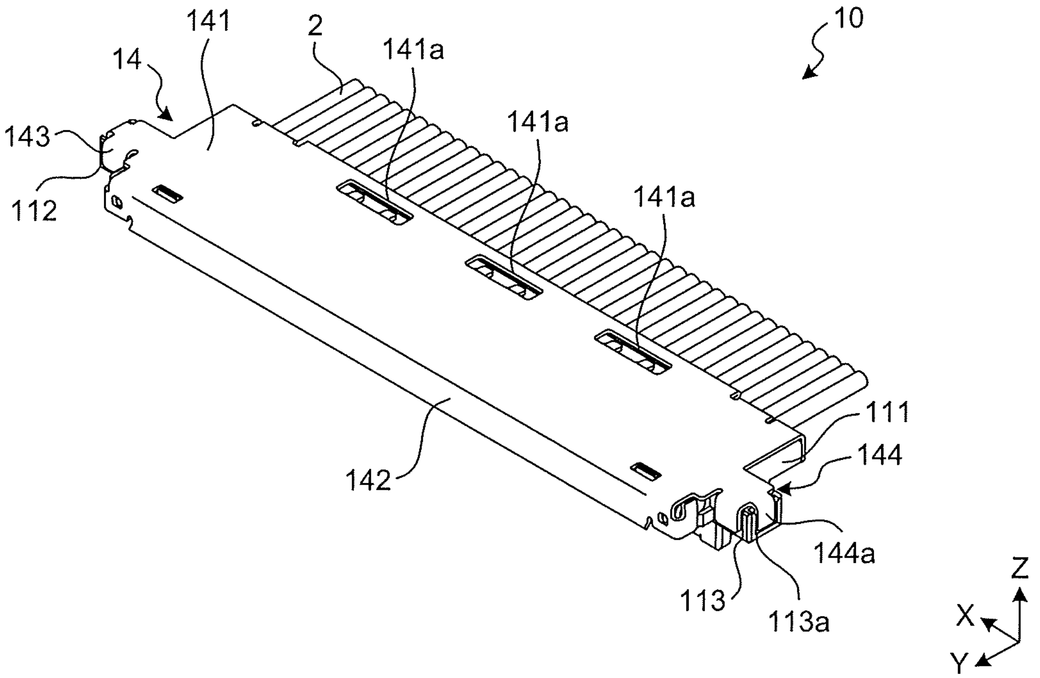
FIG. 3 is an appearance perspective view of a plug connector according to an embodiment.
Figure 6:
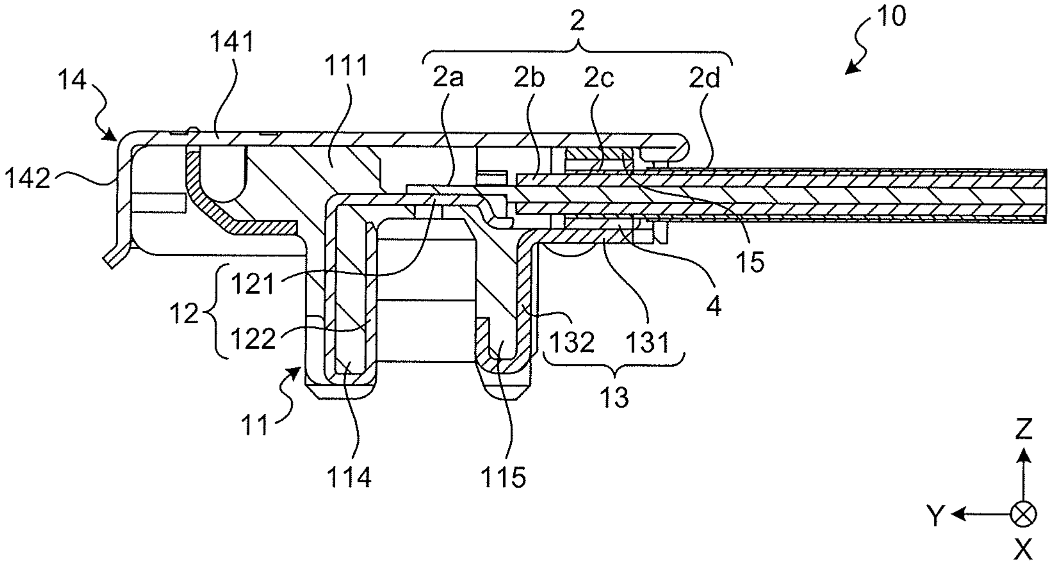
FIG. 6 is a cross-sectional view along line VI-VI as illustrated in FIG. 5.
Figure 7:
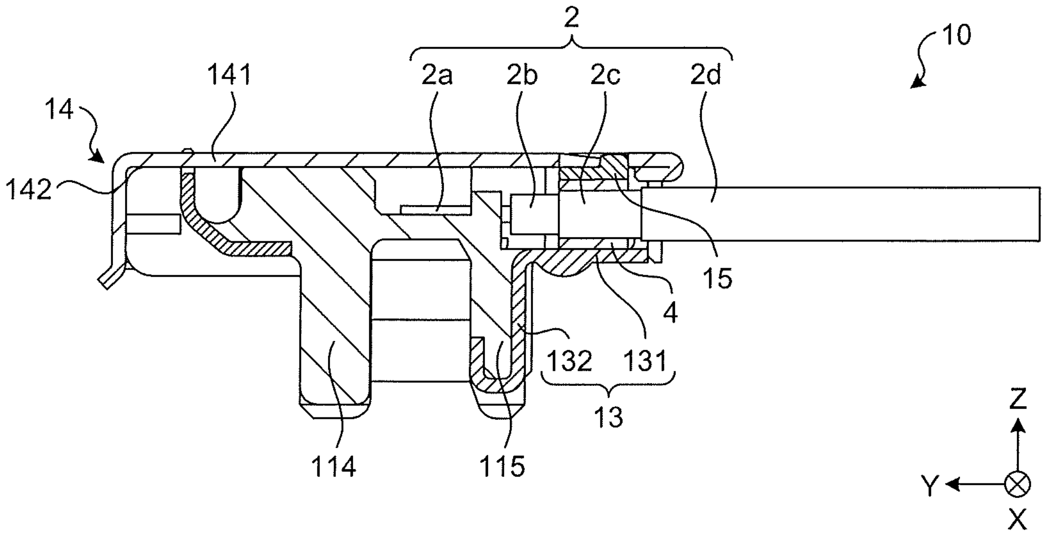
FIG. 7 is a cross-sectional view along line VII-VII as illustrated in FIG. 5.

Next, a configuration of the plug connector 10 according to an embodiment will be explained with reference to FIG. 3 to FIG. 7. As illustrated in FIG. 3, the plug connector 10 is connected to terminals of the plurality of coaxial cables 2. As illustrated in FIG. 6 and FIG. 7, the coaxial cable 2 is formed by laminating a dielectric body 2*b*, an outside conductor (a shield line) 2*c* (an example of a first ground conductive path), and an outer circumference covering material 2*d* on an outer circumferential side of a center conductor (a signal line) 2*a* (an example of a first signal conductive path) in order.

As illustrated in FIG. 6 and FIG. 7, one terminal of the coaxial cable 2 sequentially exposes the center conductor 2*a*, the dielectric body 2*b*, and the outside conductor 2*c* from a distal end side thereof. The outside conductor 2*c* among such exposed parts is sandwiched by a pair of ground bars 4 that are composed of thin plates with a conductive property, so that the plurality of coaxial cables 2 are attached to the ground bars 4.

Figure 4:
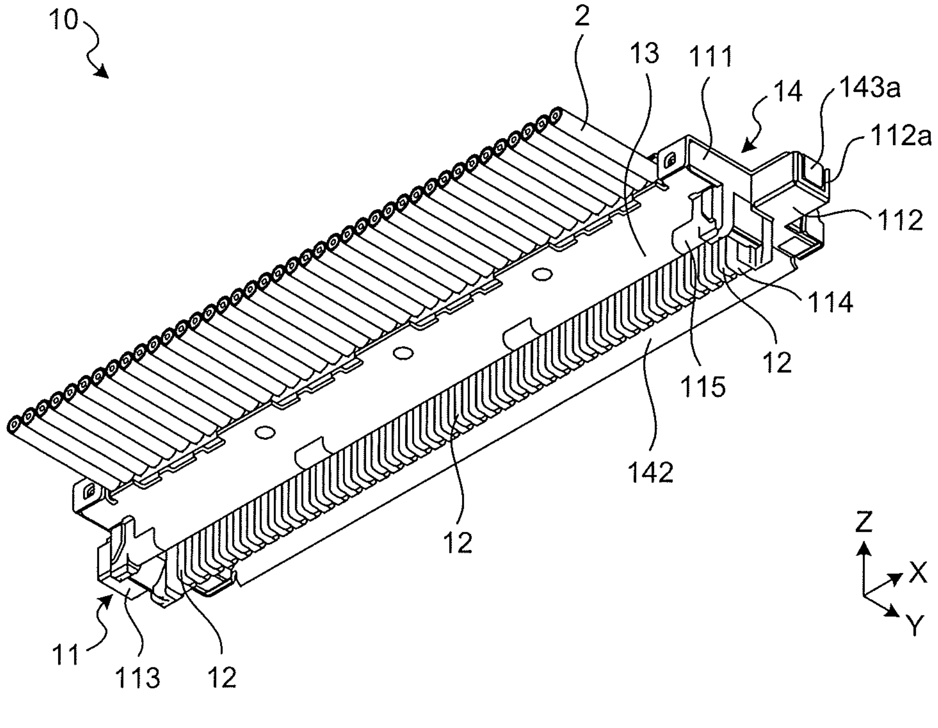
FIG. 4 is an appearance perspective view of a plug connector according to an embodiment.
Figure 5:
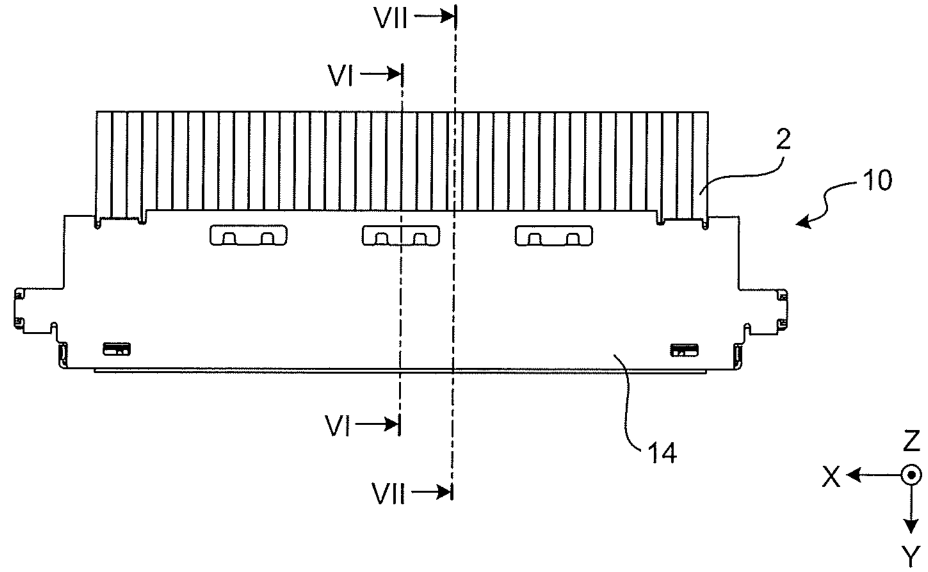
FIG. 5 is a plan view of a plug connector according to an embodiment.

As illustrated in FIG. 4, the plug connector 10 includes a housing 11 with an insulation property (an example of a first housing), the plurality of contacts 12 with a conductive property (an example of a first contact) that are arrayed on the housing 11, the conductive member 13 that contacts a lower ground bar 4 among the pair of ground bars 4, and the shell 14 with a conductive property that covers an outer surface of the housing 11 where the plurality of contacts 12 are arrayed thereon and contacts an upper ground bar 4 among the pair of ground bars.

Each of a space between the contacts 12, a space between such a contact 12 and the conductive member 13, and a space between the contact 12 and the shell 14 is insulated by the housing 11. Each of the contacts 12, the conductive member 13, and the shell 14 is formed by, for example, applying a punching process or a folding process to a single metal plate.

As illustrated in FIG. 4, the housing 11 includes a base part 111 with longitudinal directions that are positive and negative directions of an X-axis (leftward and rightward directions), a protrusion part 112 that protrudes from the base part 111 in a positive direction of the X-axis, a protrusion part 113 that protrudes from the base part 111 in a negative direction of the X-axis, and protrusion parts 114, 115 with an approximately U-shaped cross section where each thereof protrudes downward from the base part 111 and extends in the positive and negative directions of an X-axis (the leftward and rightward directions). As illustrated in FIG. 6, the protrusion parts 114, 115 are arranged so as to be spaced apart from one another in frontward and backward directions.

As illustrated in FIG. 4, the plurality of contacts 12 are arrayed so as to be spaced apart in leftward and rightward directions and fixed on the housing 11 by, for example, insert molding. As illustrated in FIG. 6, such a plurality of contacts 12 are arranged from the base part 111 to the protrusion part 114 of the housing 11. Each contact 12 exposes a proximal end part 121 thereof from an upper surface of the base part 111 in the housing 11 and such a proximal end part 121 is connected to the center conductor 2*a* of the coaxial cable 2 by soldering or the like. Furthermore, each contact 12 exposes a distal end part 122 thereof from the protrusion part 114.

As illustrated in FIG. 4, the conductive member 13 is arranged on the housing 11 so as to cover a back part of the protrusion part 115. Such a conductive member 13 is fixed on the housing 11 by, for example, insert molding. As illustrated in FIG. 6, the conductive member 13 includes a base part 131 that is provided with longitudinal directions that are leftward and rightward directions and contacts such a ground bar 4 and a J-shaped protrusion part 132 that extends downward from the base part 131. Such a protrusion part 132 is arranged on the protrusion part 115 of the housing 11.

The shell 14 has a cover upper part 141 that covers an upper part of the housing 11 in a state where one terminal of the coaxial cable 2 is arranged on the plug connector 10 and a cover front part 142 that covers a front part of the housing 11 in a state where the one terminal of the coaxial cable 2 is arranged on the plug connector 10. As illustrated in FIG. 3, a plurality of openings 141*a* are formed on the cover upper part 141. Tongue pieces are formed on edges of such a plurality of openings 141*a* and such a tongue piece and the ground bar 4 are connected by a solder 15. Additionally, FIG. 3 does not illustrate the solder 15.

Furthermore, as illustrated in FIG. 3, the shell 14 has a side protrusion part 143 that protrudes outward from a terminal of the cover upper part 141 in a positive direction of an X-axis and a side protrusion part 144 that protrudes outward from a terminal of the cover upper part 141 in a negative direction of the X-axis. As illustrated in FIG. 4, a distal end part 143*a* of the side protrusion part 143 is engaged with an engagement recess 112*a* that is formed on the protrusion part 112 of the housing 11 so as to be fixed on the housing 11. As illustrated in FIG. 3, a distal end part 144*a* of the side protrusion part 144 is engaged with an engagement recess 113*a* that is formed on the protrusion part 113 of the housing 11 so as to be fixed on the housing 11.

3. Configuration of Receptacle Connector 20

Figure 8:
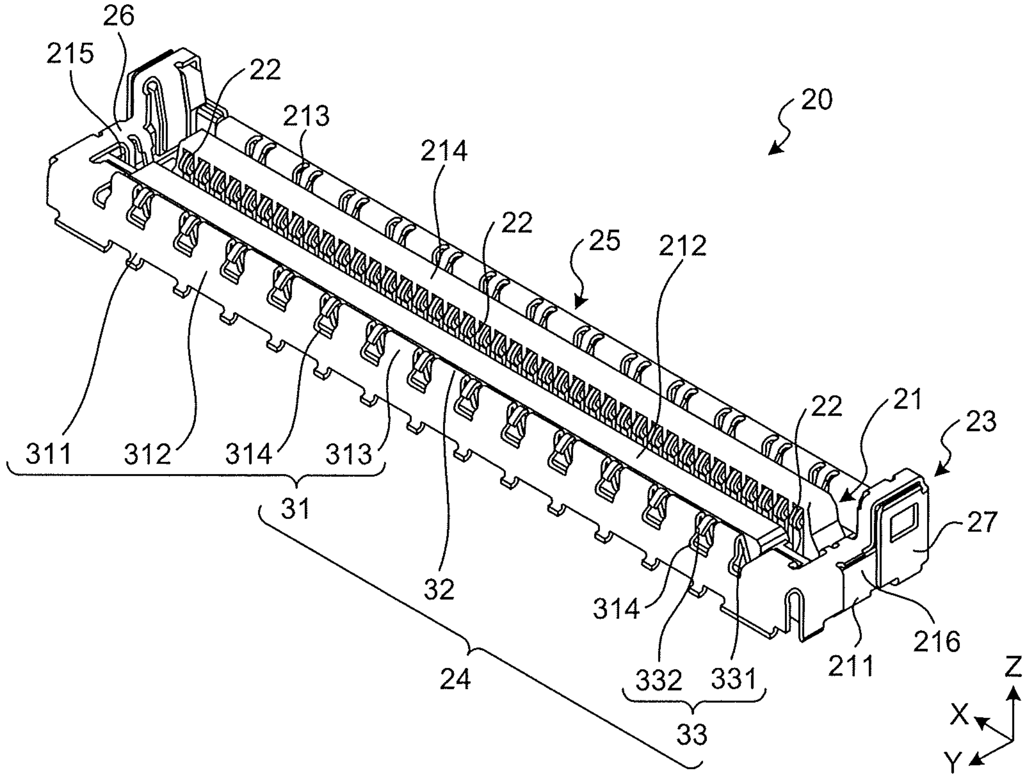
FIG. 8 is an appearance perspective view of a receptacle connector according to an embodiment.

Next, a configuration of the receptacle connector 20 according to an embodiment will be explained with reference to FIG. 8 to FIG. 12. As illustrated in FIG. 8, the receptacle connector 20 includes a housing 21 with an insulation property (an example of a second housing), a plurality of contacts 22 with a conductive property (an example of a second contact), and a shell 23 with a conductive property that is attached to the housing 21. Each of the contacts 22 and the shell 23 is formed by, for example, applying a punching process or a folding process to a single metal plate.

Figure 12:
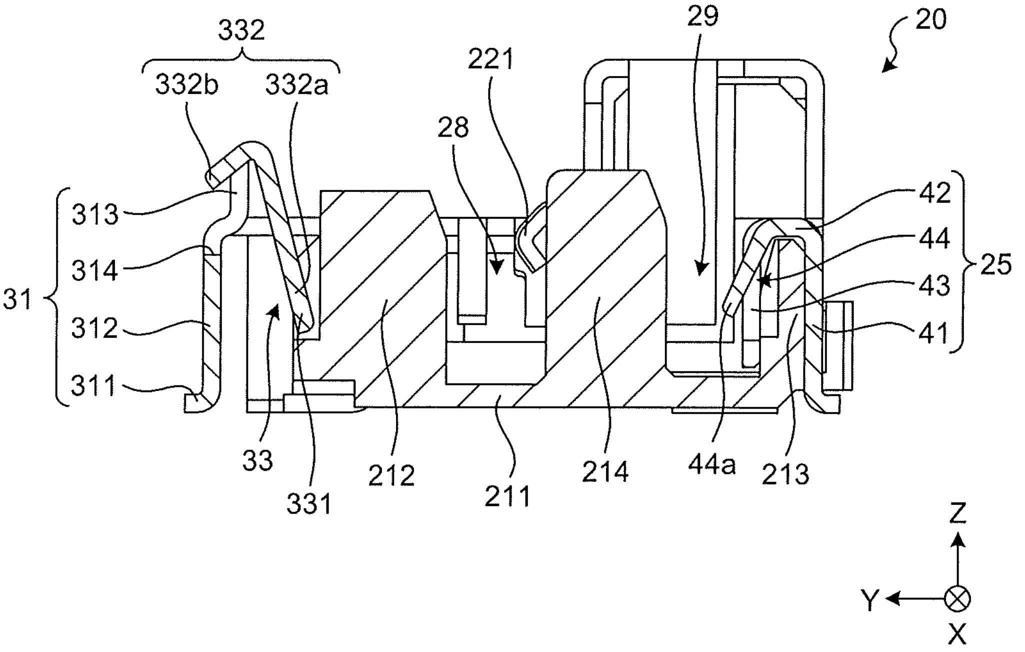
FIG. 12 is a cross-sectional view along line XII-XII as illustrated in FIG. 10.
Figure 13:
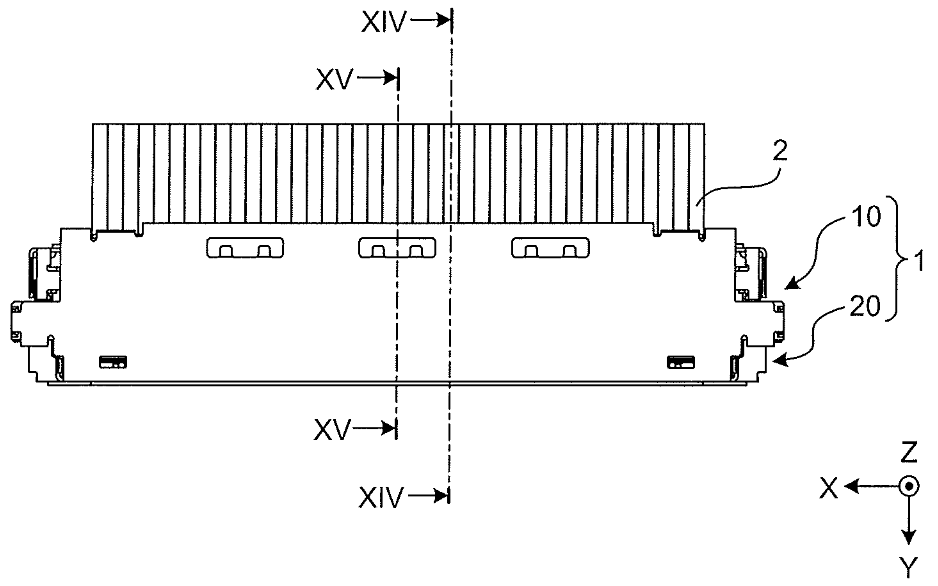
FIG. 13 is a plan view of a connector device in a state where a plug connector and a receptacle connector according to an embodiment are mated therewith.

As illustrated in FIG. 8 and FIG. 12, the housing 21 includes a base part 211, a front wall part 212, a back wall part 213, a center wall part 214, and side wall parts 215, 216. The front wall part 212, the back wall part 213, the center wall part 214, the side wall part 215, and the side wall part 216 protrude upward from the base part 211.

Figure 11:
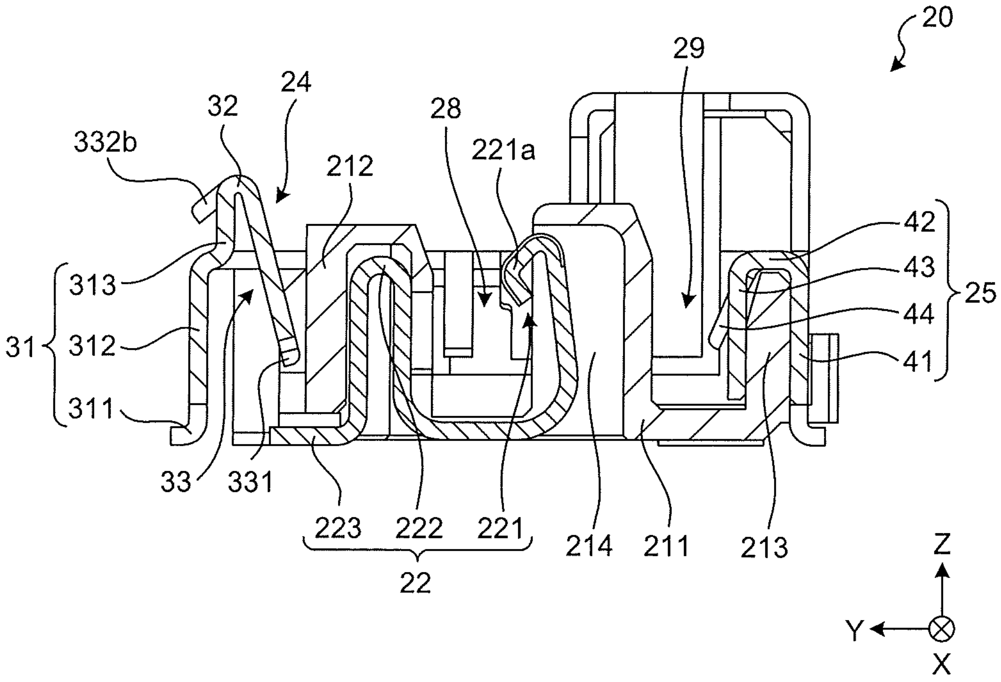
FIG. 11 is a cross-sectional view along line XI-XI as illustrated in FIG. 10.

Each of the front wall part 212, the back wall part 213, and the center wall part 214 extends in leftward and rightward directions and are arranged so as to be spaced apart from one another in frontward and backward directions. As illustrated in FIG. 8, the plurality of contacts 22 are arrayed on the center wall part 214 so as to be spaced apart in leftward and rightward directions. As illustrated in FIG. 11, the plurality of contacts 22 are arranged on the center wall part 214 by press fitting.

As illustrated in FIG. 11 and FIG. 12, a housing recess 28 where the protrusion part 114 (see FIG. 6) of the plug connector 10 is housed therein is formed between the front wall part 212 and the center wall part 214. Furthermore, a housing recess 29 where the protrusion part 115 (see FIG. 6) of the plug connector 10 is housed therein is formed between the center wall part 214 and the back wall part 213.

As illustrated in FIG. 11, such a contact 22 is provided with an intermediate part 222 that is supported by the front wall part 212 of the housing 21 and one terminal 221 that is a free end and is capable of being elastically deformed. The one terminal 221 of the contact 22 is arranged on the center wall part 214 and a contact part 221*a* that contacts the contact 12 of the plug connector 10 is formed on such one terminal 221. In a state as illustrated in FIG. 11, the contact part 221*a* protrudes frontward from the center wall part 214 and is arranged on the housing recess 28. Furthermore, another terminal 223 of the contact 22 is arranged below the front wall part 212 and electrically connected to a non-illustrated signal conductive path (an example of a second signal conductive path) that is formed on the wiring substrate 3 (see FIG. 1) by soldering or the like.

Figure 9:
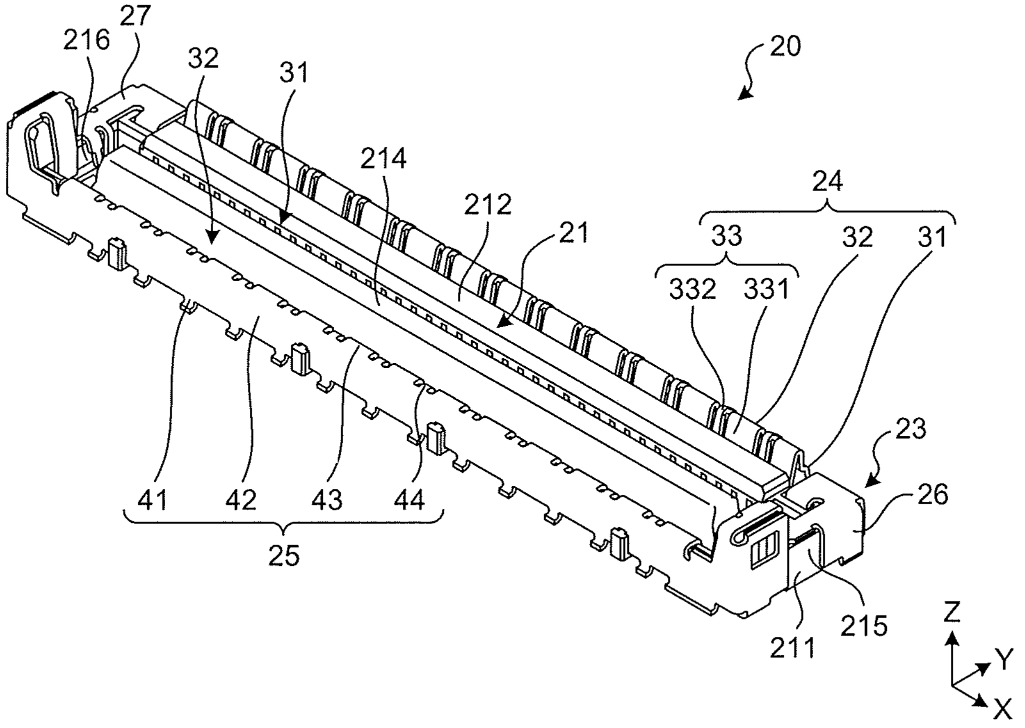
FIG. 9 is an appearance perspective view of a receptacle connector according to an embodiment.
Figure 10:
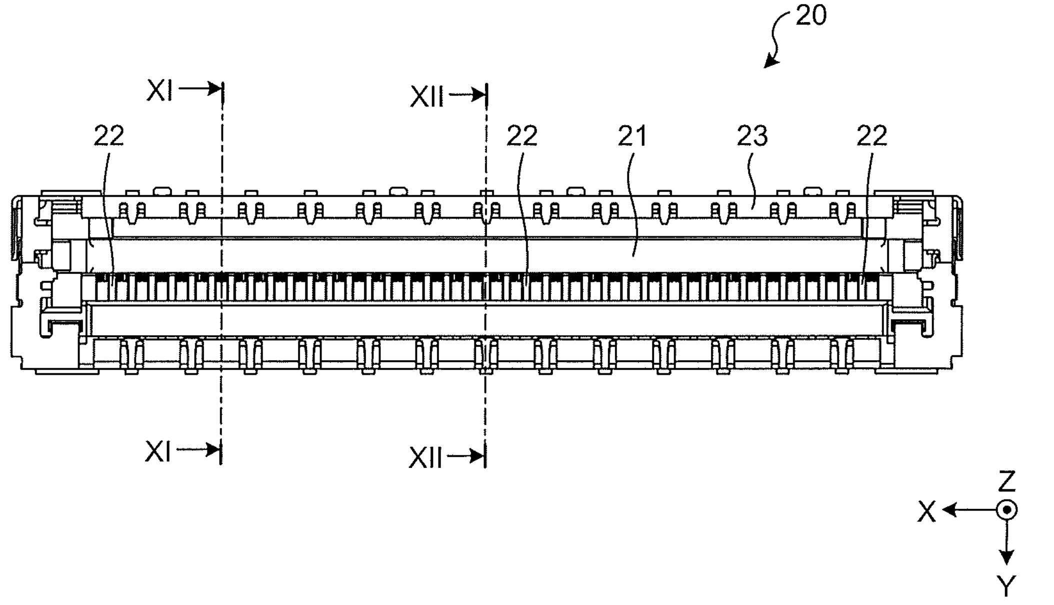
FIG. 10 is a plan view of a receptacle connector according to an embodiment.

As illustrated in FIG. 8, FIG. 9, and FIG. 11, the shell 23 includes a front wall part 24 that is arranged so as to be spaced apart from the front wall part 212 in front of the front wall part 212 on the housing 21 and a back wall part 25 that is attached to the back wall part 213 of the housing 21 and covers the back wall part 213. Furthermore, the shell 23 includes a side wall part 26 that is attached to the side wall part 215 of the housing 21 and covers the side wall part 215 and a side wall part 27 that is attached to the side wall part 216 of the housing 21 and covers the side wall part 216.

As illustrated in FIG. 9 and FIG. 11, the front wall part 24 of the shell 23 has a first side plate 31, a plurality of joining parts 32, and a second side plate 33. The first side plate 31 is provided with one end that is attached to a non-illustrated ground conductive path on the wiring substrate 3 and extends in a (upward) direction away from the wiring substrate 3 from the one end toward another end. The plurality of joining parts 32 are provided with ends that are joined to another end of the first side plate 31 and other ends that are joined to one end of the second side plate 33. The second side plate 33 extends in a (downward) direction closer to the wiring substrate 3 from one end toward another end where the other end is a free end.

As illustrated in FIG. 8, the first side plate 31 has a ground connection part 311 that is attached to a non-illustrated ground conductive path (an example of a second ground conductive path) on the wiring substrate 3, an extension part 312 that is continuous with the ground connection part 311 and extends in a (upward) direction away from the wiring substrate 3, a recess 313 that is a backward dent in a direction toward the back wall part 25 at a position close to one end of the joining part 32, and a cut part 314.

As illustrated in FIG. 9 and FIG. 11, the second side plate 33 has an extension part 331 that is provided with one end that is joined to another side of the joining part 32 and extends in a (downward) direction closer to the wiring substrate 3 from the one end toward another end where the other end is a free end. In an example as illustrated in FIG. 11, the extension part 331 extends backward and obliquely downward. Additionally, one end of the extension part 331 is one end of the second side plate 33 as described above and another end of the extension part 331 is also another end of the second side plate 33 as described above.

Furthermore, as illustrated in FIG. 8 and FIG. 12, the second side plate 33 has a plurality of contact pieces 332 that are provided with proximal ends that are joined to the extension part 331 at a position close to another end of the extension part 331 and are cantilevered and supported by the extension part 331. As illustrated in FIG. 8, each contact piece 332 is formed into an approximately L-shape and provided with a distal end part that protrudes frontward via the cut part 314. Furthermore, as illustrated in FIG. 9, the plurality of contact pieces 332 are plurally formed on the second side plate 33 so as to be spaced apart.

As illustrated in FIG. 12, such a contact piece 332 has a contact piece extension part 332*a* with one end that is joined to a position close to another end of the extension part 331 on the extension part 331 and a contact part 332*b* that is joined to another end of the contact piece extension part 332*a* and contacts the shell 14 of the plug connector 10. The contact piece extension part 332*a* extends in a (upward) direction away from the wiring substrate 3 from one end to another end. In an example as illustrated in FIG. 12, the contact piece extension part 332*a* has a flexural part for forming the contact part 332*b* at a position close to another end, and extends frontward and obliquely upward from a position close to another end of the extension part 331 and subsequently extends frontward and obliquely downward.

As illustrated in FIG. 11, the contact part 332*b* is arranged to be close to one end (or close to an upper end) of the joining part 32 on the contact piece 332 in upward and downward directions that are directions orthogonal to the principal surface M (see FIG. 1) of the wiring substrate 3. Furthermore, the contact part 332*b* is arranged at a position close to the first side plate 31 (or close to an outside) on the second side plate 33 in frontward and backward directions that are directions along the principal surface M of the wiring substrate 3 where the directions are orthogonal to an array direction of the contacts 22.

As illustrated in FIG. 11, the back wall part 25 of the shell 23 has a first side plate 41, a joining part 42, a second side plate 43, and a contact piece 44. The first side plate 41 is provided with one end that is attached to a non-illustrated ground conductive path on the wiring substrate 3 and extends in a (upward) direction away from the wiring substrate 3 from the one end toward another end. The joining part 42 is provided with one end that is joined to another end of the first side plate 41 and another end that is joined to one end of the second side plate 43. The second side plate 43 extends in a (downward) direction closer to the wiring substrate 3 from one end toward another end.

As illustrated in FIG. 12, the contact piece 44 is provided with one end that is joined to another end of the joining part 42 and extends in a (downward) direction closer to the wiring substrate 3 from one end toward another end. In an example as illustrated in FIG. 12, the contact piece 44 extends frontward and obliquely downward. Such a contact piece 44 is cantilevered and supported by the joining part 42 and another end thereof is a free end. For the contact piece 44, as illustrated in FIG. 12, a contact part 44*a* that contacts the protrusion part 132 (see FIG. 6) of the conductive member 13 is arranged on another end of the contact piece 44. In a state as illustrated in FIG. 11, the contact piece 44 protrudes frontward from the back wall part 213 and is arranged in the housing recess 29.

4. Mating State of Plug Connector 10 and Receptacle Connector 20

Next, a mating state of the plug connector 10 and the receptacle connector 20 will be explained specifically, with reference to FIG. 6 and FIG. 12 to FIG. 15.

The plug connector 10 is inserted into the receptacle connector 20, so that the plug connector 10 and the receptacle connector 20 are provided in a mating state thereof. Insertion of the plug connector 10 into the receptacle connector 20 is executed by inserting the protrusion part 114 (see FIG. 6) of the plug connector 10 into the housing recess 28 (see FIG. 12) of the receptacle connector 20 and inserting the protrusion part 115 (see FIG. 6) of the plug connector 10 into the housing recess 29 (see FIG. 12) of the receptacle connector 20.

In a case where the plug connector 10 and the receptacle connector 20 are provided in a mating state thereof, the plurality of contacts 12 with a conductive property on the plug connector 10 are electrically connected to the plurality of contacts 22 with a conductive property on the receptacle connector 20. Specifically, the distal end part 122 of the contact 12 contacts the contact part 221*a* of the contact 22, so that the contact 12 and the contact 22 are electrically connected.

The center conductor 2*a* of the coaxial cable 2 is connected to the proximal end part 121 of the contact 12 by soldering or the like, and the other terminal 223 of the contact 22 is connected to a non-illustrated signal conductive path that is formed on the wiring substrate 3. Hence, in a case where the plug connector 10 and the receptacle connector 20 are provided in a mating state thereof, the center conductor 2*a* of the coaxial cable 2 and a signal conductive path of the wiring substrate 3 are electrically connected.

Figure 15:
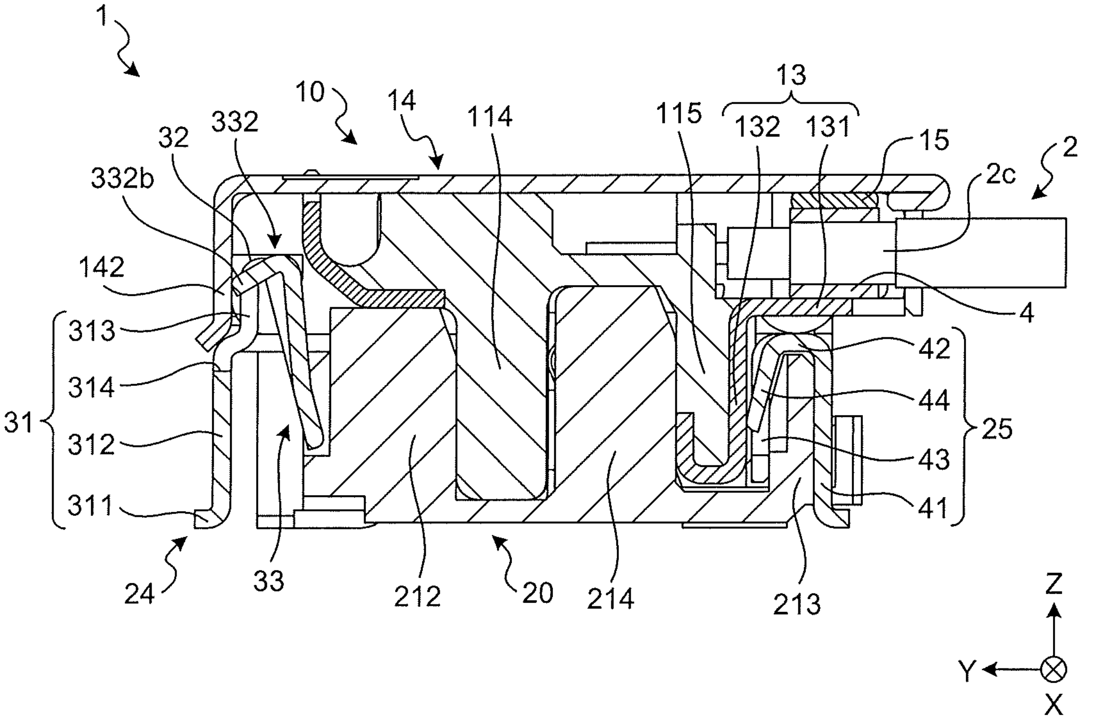
FIG. 15 is a cross-sectional view along line XV-XV as illustrated in FIG. 13.

Furthermore, in a case where the plug connector 10 and the receptacle connector 20 are provided in a mating state thereof, the protrusion part 132 of the conductive member 13 on the plug connector 10 contacts the contact piece 44 of the back wall part 25 on the shell 23, as illustrated in FIG. 15. The base part 131 of the conductive member 13 is connected to the outside conductor 2*c* of the coaxial cable 2 via the ground bar 4, and one end of the first side plate 41 of the back wall part 25 is connected to a non-illustrated ground conductive path that is formed on the wiring substrate 3, by soldering or the like.

Hence, the outside conductor 2*c* of the coaxial cable 2 is electrically connected to a non-illustrated ground conductive path that is formed on the wiring substrate 3, via the ground bar 4 and the conductive member 13. Furthermore, the outside conductor 2*c* of the coaxial cable 2 is electrically connected to the shell 14 of the plug connector 10 via the ground bar 4 and a non-illustrated solder.

Thus, the shell 14 and the shell 23 are electrically connected. The contacts 12, 22 are surrounded by the shells 14, 23 that are electrically connected and the conductive member 13, and thereby, a shield function in the connector device 1 is realized.

Figure 14:
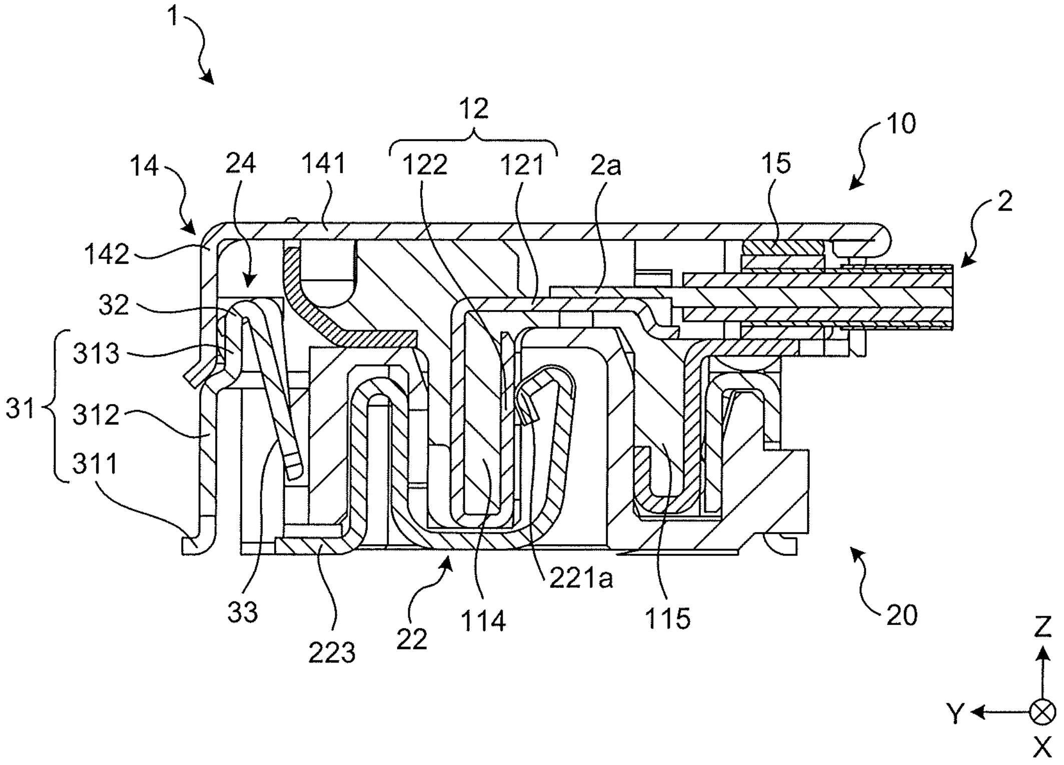
FIG. 14 is a cross-sectional view along line XIV-XIV as illustrated in FIG. 13.

Moreover, in a case where the plug connector 10 and the receptacle connector 20 are provided in a mating state thereof, the contact part 332*b* of the contact piece 332 on the second side plate 33 contacts the cover front part 142 of the shell 14, as illustrated in FIG. 15. The second side plate 33 is joined to the first side plate 31 via the joining part 32 as illustrated in FIG. 14 and one terminal of the first side plate 31 is connected to a non-illustrated ground conductive path that is formed on the wiring substrate 3, by soldering or the like.

Hence, the cover front part 142 of the shell 14 is electrically connected to a non-illustrated ground conductive path that is formed on the wiring substrate 3, via the front wall part 24 of the shell 23. Thereby, as a conductive path to a non-illustrated ground conductive path that is formed on the wiring substrate 3, a path that passes through the shell 14 and the front wall part 24 is added to the shell 14 in addition to a path that passes through the conductive member 13 and the back wall part 25. Hence, it is possible for the connector device 1 to improve a shield function of the shell 14, so that it is possible to attain further improvement of such a shield function, as compared with a case where the front wall part 24 is absent or a case where the front wall part 24 does not contact the shell 14.

Furthermore, as illustrated in FIG. 12, the contact piece 332 is formed on the second side plate 33, so that a spring length is readily ensured, for example, as compared with a case where it protrudes outward from the joining part 32. Hence, it is possible to attain downsizing and height reduction of the connector device 1. Furthermore, one end or a proximal end of the contact piece 332 is joined to a position close to another end (or close to a lower end) of the second side plate 33, so that a spring length of the contact piece 332 is ensured more readily.

Furthermore, as illustrated in FIG. 12, the second side plate 33 is arranged between the first side plate 31 and the front wall part 212 of the housing 21. Hence, as compared with a case where the second side plate 33 is positioned in front of the first side plate 31, it is possible to reduce a length of the connector device 1 in frontward and backward directions, so that it is possible to attain downsizing of the connector device 1.

Furthermore, as illustrated in FIG. 15, the contact piece 332 has the contact part 332*b* that contacts the shell 14 of the plug connector 10 at a position close to the first side plate 31 in frontward and backward directions. Also thereby, a spring length of the contact piece 332 is ensured more readily.

The contact part 332*b* is arranged to be close to one end (or close to an upper end) of the joining part 32 on the contact piece 332 in upward and downward directions. Thereby, as compared with a case where the contact part 332*b* is arranged to be close to another end (or close to a lower end) of the joining part 32 and the contact part 332*b* contacts the shell 14 at a position close to another end of the joining part 32, a spring length of the contact piece 332 is ensured more readily. Moreover, as the contact part 332*b* is arranged to be close to one end (or close to an upper end) of the joining part 32 in upward and downward directions, it is also possible to increase a distance of sliding and mating of the contact part 332*b* and the shell 14 (the cover front part 142) (a so-called effective mating length) as the plug connector 10 and the receptacle connector 20 are mated.

Furthermore, as illustrated in FIG. 14, the first side plate 31 has the recess 313 at a position close to one end of the joining part 32 in upward and downward directions where the position is opposed to the cover front part 142 of the shell 14 on the plug connector 10. Such a recess 313 is a backward dent in a direction toward the back wall part 25.

Hence, as illustrated in FIG. 14, it is possible to provide a position of the cover front part 142 in frontward and backward directions as a position that is substantially identical to a position of the extension part 312 of the front wall part 24. Thereby, it is possible to reduce a length of the connector device 1 in frontward and backward directions, so that it is possible to attain downsizing of the connector device 1.

Meanwhile, in a case where the first side plate 31 is conventionally cut to provide a contact piece, the first side plate 31 has to be cut long from a position close to one end of the first side plate 31 to another end thereof in order to ensure a spring length of such a contact piece. In such a case, a length of the first side plate 31 in upward and downward directions is increased, so that a length of the shell 23 in upward and downward directions is increased. Furthermore, a cut part on the first side plate 31 in upward and downward directions is long, so that an electromagnetic wave leaks from such a cut part and a shield function of the shell 23 is degraded.

The contact piece 332 in the connector device 1 according to the present embodiment is formed on the second side plate 33 that is joined to the first side plate 31 via the joining part 32. Thereby, the cut part 314 of the first side plate 31 is sufficiently provided with a size not to contact the contact part 332*b* that is present at a position close to one end of the joining part 32 in upward and downward directions.

Figure 16:
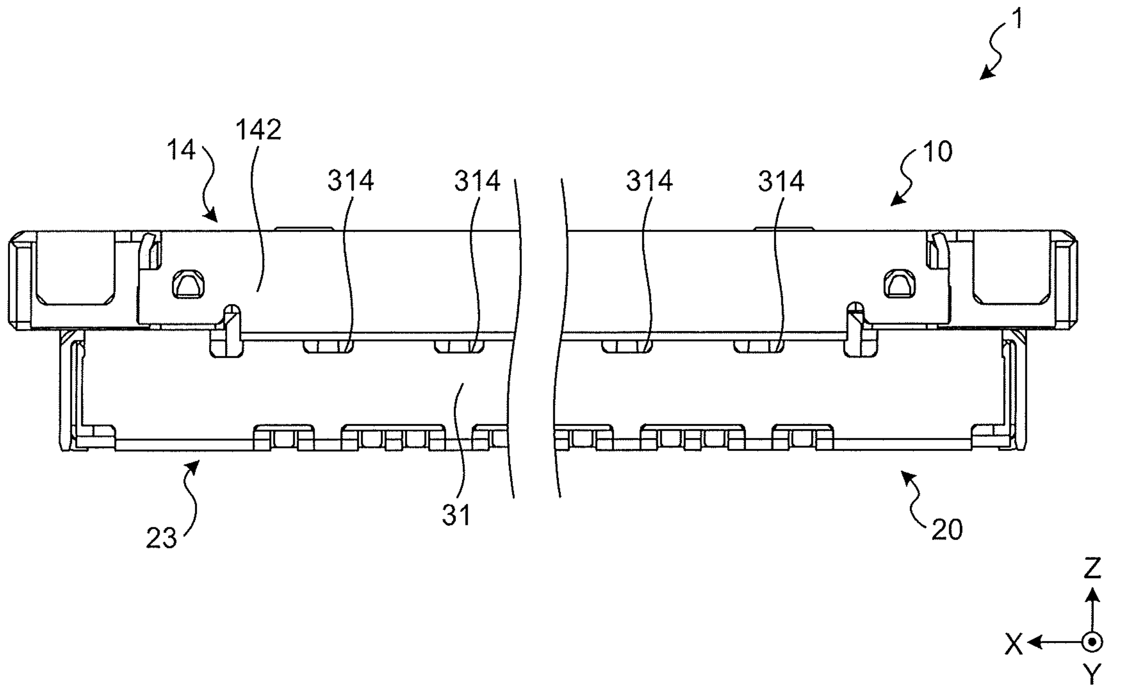
FIG. 16 is a front elevation view of a connector device in a state where a plug connector and a receptacle connector according to an embodiment are mated therewith.

Hence, as compared with a case where a contact piece is conventionally provided on the first side plate 31, it is possible to decrease a length of the cut part 314 of the first side plate 31 in upward and downward directions as illustrated in FIG. 16, so that it is possible to downsize a part of the cur part 314 that is not covered by the cover front part 142 of the shell 14. Additionally, a size of a part of the cut part 314 that is not covered by the cover front part 142 of the shell 14 is a size not to pass an electromagnetic wave that has a frequency identical to a frequency of a signal that is transmitted by the contacts 12, 22, and thereby, it is possible to reduce degradation of a shield function.

Additionally, although the cut part 314 is formed from a position that corresponds to the extension part 312 to a position that corresponds to the joining part 32 in upward and downward directions in an example as illustrated in FIG. 8, a configuration may be provided in such a manner that it is formed from a position that corresponds to the recess 313 to a position that corresponds to the joining part 32 in upward and downward directions. Thereby, it is possible to cover the cut part 314 with the cover front part 142 of the shell 14.

Furthermore, as illustrated in FIG. 15, in a case where the plug connector 10 and the receptacle connector 20 are provided in a mating state thereof, the protrusion part 132 on the conductive member 13 is positioned in front of the back wall part 25 and the cover front part 142 on the shell 14 is positioned in front of the contact piece 332 on the front wall part 24. In such a case, the contact piece 332 contacts the cover front part 142 while having a sufficient spring length. Hence, even in a case where a state where the plug connector 10 is tiled relative to the receptacle connector 20 is provided in a process to remove the plug connector 10 from the receptacle connector 20, it is possible to prevent the contact piece 332 from being deformed plastically.

For example, in a case where the coaxial cable 2 that is connected to the plug connector 10 is gripped and lifted upward, the plug connector 10 is tiled in such a manner that a back part close to the protrusion part 115 is raised while a circumference of the cover front part 142 is a point of support. In such a case, the cover front part 142 of the shell 14 on the plug connector 10 is moved in a direction away from the contact part 332*b* of the contact piece 332. Hence, it is possible to prevent a great force from acting on the contact piece 332 as compared with a case where the cover front part 142 is positioned in back of the contact piece 332.

Furthermore, in a case where a front part of the plug connector 10 is lifted in a process to remove the plug connector 10 from the receptacle connector 20, the plug connector 10 is tiled in such a manner that a front part close to the cover front part 142 is raised while a circumference of the protrusion part 115 is a point of support. In such a case, the cover front part 142 of the shell 14 on the plug connector 10 is moved in a direction away from the contact part **332*b* of the contact piece 332. Hence, it is possible to prevent a great force from acting on the contact piece 332 as compared with a case where the cover front part 142 is positioned in back of the contact piece 332**.

Furthermore, as illustrated in FIG. 8, the contact piece 332 is arranged so as to protrude frontward from the cut part 314. Hence, even in a case where the cover front part 142 of the shell 14 is moved backward, the cover front part 142 contacts the recess 313, so that it is possible to limit further movement thereof. Hence, also thereby, it is possible to prevent a great force from acting on the contact piece 332.

As described above, the receptacle connector 20 according to an embodiment is an electrical connector that is attached to the wiring substrate 3 and is mated with the plug connector 10 that is connected to terminals of the plurality of coaxial cables 2. The plurality of coaxial cables 2 are an example of a signal transmission medium and the plug connector 10 is an example of a counterpart connector. The receptacle connector 20 includes the housing 21 that has an insulation property, the plurality of contacts 22 with a conductive property that are arrayed on the housing 21, and the shell 23 with a conductive property. The shell 23 has the front wall part 24 and the back wall part 25 that are opposed to one another via the plurality of contacts 22 in a direction along the principal surface M of the wiring substrate 3 where the direction is orthogonal to an array direction of the plurality of contacts 22, and contact the conductive member 13 and the shell 14 that are provided with a conductive property on the plug connector 10. The front wall part 24 and the back wall part 25 are an example of a pair of wall parts. The front wall part 24 is an example of one wall part. The conductive member 13 and the shell 14 are an example of a ground member. The front wall part 24 includes the first side plate 31 that is provided with one end that is attached to a ground conductive path of the wiring substrate 3 and extends in a direction away from the wiring substrate 3 from the one end toward another end, the joining part 32 that is provided with one end that is joined to another end of the first side plate 31, and the second side plate 33 that is provided with one end that is joined to another end of the joining part 32 and extends in a direction closer to the wiring substrate 3 from the one end toward another end where the other end is a free end. Then, the second side plate 33 has the contact piece 332 that extends in a direction away from the wiring substrate 3 and elastically contacts the shell 14 of the plug connector 10. Thereby, it is possible for the receptacle connector 20 according to an embodiment to attain further improvement of a shield function.

Furthermore, the second side plate 33 has the extension part 331 that is provided with one end that is joined to another end of the joining part 32 and extends in a direction closer to the wiring substrate 3 from the one end toward another end where the other end is a free end. The contact piece 332 is provided with one end that is joined to a position close to another end of the extension part 331 on the extension part 331 and extends in a direction away from the wiring substrate 3 from the one end toward another end. Thereby, it is possible to readily ensure a spring length, for example, as compared with a case where it protrudes from the joining part 32.

Furthermore, the second side plate 33 is arranged between the first side plate 31 and the housing 21. It is possible to reduce a length of the connector device 1 in frontward and backward directions as compared with a case where the second side plate 33 is positioned in front of the first side plate 31, so that it is possible to attain downsizing of the connector device 1.

Furthermore, the contact piece 332 has the contact part **332*b* that contacts the shell 14 of the plug connector 10 at a position close to the first side plate 31 in a direction along the principal surface M of the wiring substrate 3 where the direction is orthogonal to an array direction of the contacts 22. Thereby, it is possible to ensure a spring length of the contact piece 332** more readily.

Furthermore, the contact part **332*b* is arranged to be close to one end of the joining part 32 on the contact piece 332 in a direction orthogonal to the principal surface M of the wiring substrate 3. Thereby, a spring length of the contact piece 332** is ensured more readily.

Furthermore, the first side plate 31 has the recess 313 at a position close to one end of the joining part 32 in a direction orthogonal to the principal surface M of the wiring substrate 3 where the position is opposed to the cover front part 142 of the shell 14 of the plug connector 10, and such a recess 313 is a dent in a direction toward the back wall part 25. Thereby, it is possible to attain downsizing of the connector device 1. The back wall part 25 is an example of another wall part.

According to an aspect of an embodiment, it is possible to provide an electrical connector and a connector device that are capable of attaining further improvement of a shield function thereof.

An additional effect or variation can readily be derived by a person(s) skilled in the art. Hence, a broader aspect of the present invention is not limited to a specific detail(s) and a representative embodiment(s) as illustrated and described above. Therefore, various modifications are allowed without departing from a spirit and a scope of a general inventive concept as defined by the appended claim(s) and an equivalent(s) thereof.

What is claimed is:

1. An electrical connector, wherein the electrical connector is mated with a counterpart connector that is attached to a principal surface of a wiring substrate, wherein the counterpart connector includes:

a first housing that has an insulation property;

a plurality of first contacts with a conductive property that are arrayed on the first housing; and a pair of wall parts with a conductive property that are opposed to one another through the plurality of first contacts in a direction that is a direction along the principal surface and is orthogonal to an array direction of the plurality of first contacts, one wall part in the pair of wall parts with a conductive property is provided with:

a cut part; and a contact piece with a conductive property that is provided with a part that protrudes through the cut part, the one wall part is located outside end parts of the plurality of first contacts that are electrically connected to a conductive path of the wiring substrate in a direction that is a direction along the principal surface and is orthogonal to the array direction, the electrical connector includes:

a second housing that has an insulation property;

a plurality of second contacts with a conductive property that are arrayed on the second housing in a first direction that is provided as an array direction thereof and are connected to the plurality of first contacts;

a first shell with a conductive property that has a first cover part that is opposed to the plurality of second contacts in a second direction that is orthogonal to the first direction and covers the plurality of second contacts and a second cover part that extends in the second direction from one end part of the first cover part in a third direction that is orthogonal to the first direction and the second direction; and a second shell with a conductive property that is arranged near another end part of the first cover part in the third direction, in a state where the counterpart connector and the electrical connector are mated, the first cover part is opposed to the plurality of first contacts in the second direction and covers a whole of the plurality of first contacts, the second cover part covers a part or all of the cut part in a state where it contacts the contact piece, and the second shell is opposed to and contacts another wall part in the pair of wall parts with a conductive property in the third direction, and in a state where the electrical connector and the counterpart connector are mated, the electrical connector has a housing space that houses a part of the one wall part near the first cover part to have a gap with a part of the part of the one wall part near the another wall part.

2. An electrical connector, wherein the electrical connector is attached to a principal surface of a wiring substrate and is mated with a counterpart connector, wherein the electrical connector includes:

a first housing that has an insulation property;

a plurality of first contacts with a conductive property that are arrayed on the first housing; and a pair of wall parts with a conductive property that are opposed to one another through the plurality of first contacts in a direction that is a direction along the principal surface and is orthogonal to an array direction of the plurality of first contacts, one wall part in the pair of wall parts with a conductive property is provided with:

a cut part; and a contact piece with a conductive property that is provided with a part that protrudes through the cut part, the one wall part is located outside end parts of the plurality of first contacts that are electrically connected to a conductive path of the wiring substrate in a direction that is a direction along the principal surface and is orthogonal to the array direction, the counterpart connector includes:

a second housing that has an insulation property;

a plurality of second contacts with a conductive property that are arrayed on the second housing in a first direction that is provided as an array direction thereof and are connected to the plurality of first contacts;

a first shell with a conductive property that has a first cover part that is opposed to the plurality of second contacts in a second direction that is orthogonal to the first direction and covers the plurality of second contacts and a second cover part that extends in the second direction from one end part of the first cover part in a third direction that is orthogonal to the first direction and the second direction; and a second shell with a conductive property that is arranged near another end part of the first cover part in the third direction, in a state where the electrical connector and the counterpart connector are mated, the first cover part is opposed to the plurality of first contacts in the second direction and covers a whole of the plurality of first contacts, the second cover part covers a part or all of the cut part in a state where it contacts the contact piece, and the second shell is opposed to and contacts another wall part in the pair of wall parts with a conductive property in the third direction, and in a state where the electrical connector and the counterpart connector are mated, the counterpart connector has a housing space that houses a part of the one wall part near the first cover part to have a gap with a part of the part of the one wall part near the another wall part.

3. An electrical connector, wherein the electrical connector is mated with a counterpart connector that is attached to a principal surface of a wiring substrate, wherein the counterpart connector includes:

a first housing that has an insulation property;

a plurality of first contacts with a conductive property that are arrayed on the first housing; and a pair of wall parts with a conductive property that are opposed to one another through the plurality of first contacts in a direction that is a direction along the principal surface and is orthogonal to an array direction of the plurality of first contacts, one wall part in the pair of wall parts with a conductive property is provided with:

a cut part; and a contact piece with a conductive property that is provided with a part that protrudes through the cut part, the one wall part is located outside end parts of the plurality of first contacts that are electrically connected to a conductive path of the wiring substrate in a direction that is a direction along the principal surface and is orthogonal to the array direction, the electrical connector includes:

a second housing that has an insulation property;

a plurality of second contacts with a conductive property that are arrayed on the second housing in a first direction that is provided as an array direction thereof and are connected to the plurality of first contacts;

a first shell with a conductive property that has a first cover part that is opposed to the plurality of second contacts in a second direction that is orthogonal to the first direction and covers the plurality of second contacts and a second cover part that extends in the second direction from one end part of the first cover part in a third direction that is orthogonal to the first direction and the second direction; and a second shell with a conductive property that is arranged near another end part of the first cover part in the third direction, in a state where the counterpart connector and the electrical connector are mated, the first cover part is opposed to the plurality of first contacts in the second direction and covers a whole of the plurality of first contacts, the second cover part covers a part or all of the cut part in a state where it contacts the contact piece, and the second shell is opposed to and contacts another wall part in the pair of wall parts with a conductive property in the third direction, a part of the one wall part near the first cover part has a recess that is a dent in a direction toward another wall part in the pair of wall parts, and in a state where the electrical connector and the counterpart connector are mated, the electrical connector has a housing space that houses the part of the one wall part near the first cover part.

4. An electrical connector, wherein the electrical connector is attached to a principal surface of a wiring substrate and is mated with a counterpart connector, wherein the electrical connector includes:

a first housing that has an insulation property;

a plurality of first contacts with a conductive property that are arrayed on the first housing; and a pair of wall parts with a conductive property that are opposed to one another through the plurality of first contacts in a direction that is a direction along the principal surface and is orthogonal to an array direction of the plurality of first contacts, one wall part in the pair of wall parts with a conductive property is provided with:

a cut part; and a contact piece with a conductive property that is provided with a part that protrudes through the cut part, the one wall part is located outside end parts of the plurality of first contacts that are electrically connected to a conductive path of the wiring substrate in a direction that is a direction along the principal surface and is orthogonal to the array direction, the counterpart connector includes:

a second housing that has an insulation property;

a plurality of second contacts with a conductive property that are arrayed on the second housing in a first direction that is provided as an array direction thereof and are connected to the plurality of first contacts;

a first shell with a conductive property that has a first cover part that is opposed to the plurality of second contacts in a second direction that is orthogonal to the first direction and covers the plurality of second contacts and a second cover part that extends in the second direction from one end part of the first cover part in a third direction that is orthogonal to the first direction and the second direction; and a second shell with a conductive property that is arranged near another end part of the first cover part in the third direction, in a state where the electrical connector and the counterpart connector are mated, the first cover part is opposed to the plurality of first contacts in the second direction and covers a whole of the plurality of first contacts, the second cover part covers a part or all of the cut part in a state where it contacts the contact piece, and the second shell is opposed to and contacts another wall part in the pair of wall parts with a conductive property in the third direction, a part of the one wall part near the first cover part has a recess that is a dent in a direction toward another wall part in the pair of wall parts, and in a state where the electrical connector and the counterpart connector are mated, the counterpart connector has a housing space that houses the part of the one wall part near the first cover part.

* * * * *